(12) United States Patent
Saito et al.

(10) Patent No.: US 8,778,499 B2
(45) Date of Patent: Jul. 15, 2014

(54) COATING COMPOSITION FOR SOLAR HEAT-COLLECTING REFLECTOR, AND SOLAR HEAT-COLLECTING REFLECTOR AND PROCESS FOR ITS PRODUCTION

(75) Inventors: Shun Saito, Tokyo (JP); Masataka Aikawa, Tokyo (JP); Takashi Takayanagi, Tokyo (JP); Sho Masuda, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/568,256

(22) Filed: Aug. 7, 2012

(65) Prior Publication Data
US 2012/0301728 A1 Nov. 29, 2012

Related U.S. Application Data

(63) Continuation of application No. PCT/JP2011/054188, filed on Feb. 24, 2011.

(30) Foreign Application Priority Data

Feb. 26, 2010 (JP) .................................. 2010-042404

(51) Int. Cl.
| | | |
|---|---|---|
| *B05D 3/02* | (2006.01) | |
| *B32B 15/08* | (2006.01) | |
| *F24J 2/46* | (2006.01) | |
| *C09D 175/04* | (2006.01) | |
| *C08G 18/62* | (2006.01) | |
| *C08G 18/71* | (2006.01) | |
| *C08G 18/79* | (2006.01) | |
| *F24J 2/10* | (2006.01) | |
| *G02B 5/08* | (2006.01) | |
| *C09D 127/12* | (2006.01) | |

(52) U.S. Cl.
CPC ............... *C09D 127/12* (2013.01); *Y02E 10/40* (2013.01); *C09D 175/04* (2013.01); *C08G 18/6279* (2013.01); *C08G 18/718* (2013.01); *C08G 18/792* (2013.01); *F24J 2/1057* (2013.01); *G02B 5/0808* (2013.01); *F24J 2002/1071* (2013.01)
USPC ........... 428/421; 428/426; 428/457; 126/711; 427/388.2

(58) Field of Classification Search
None
See application file for complete search history.

(56) References Cited

U.S. PATENT DOCUMENTS 4,859,755 A * 8/1989 Schlipf et al. ................. 526/255
6,613,818 B1 * 9/2003 Sakatoku et al. ............... 524/83

FOREIGN PATENT DOCUMENTS

EP          1 956 657 A1    8/2008
JP          61-093349       5/1986

(Continued)

OTHER PUBLICATIONS

Derwent 1986-295766, abstract of JP 61-218609 A, Sep. 1986.*

(Continued)

*Primary Examiner* — Ramsey Zacharia
(74) *Attorney, Agent, or Firm* — Oblon, Spivak, McClelland, Maier & Neustadt, L.L.P.

(57) ABSTRACT

To provide a coating composition for back coating, by which, in a solar heat-collecting reflector, a cured coating film layer excellent in durability such as heat resistance or water resistance and excellent in weather resistance, scratch resistance and impact resistance, can be formed, and a solar heat-collecting reflector having such a cured coating film layer. A coating composition for back coating to be used for the production of a solar heat-collecting reflector, which comprises a fluoropolymer (A) having units (A1) derived from a fluoroolefin and units (A2) having a crosslinkable group. A solar heat-collecting reflector having a cured coating film layer formed by the coating composition.

14 Claims, 1 Drawing Sheet

(56) References Cited

FOREIGN PATENT DOCUMENTS

| JP | 61-218609 | 9/1986 |
|----|-----------|--------|
| JP | 01247448 A * | 10/1989 |
| JP | 05-161531 | 6/1993 |
| JP | 05-280807 | 10/1993 |
| JP | 08-283616 | 10/1996 |
| JP | 10-033333 | 2/1998 |
| JP | 10-130535 | 5/1998 |
| JP | 10-147739 | 6/1998 |
| JP | 10-147740 | 6/1998 |
| JP | 2001-089744 | 4/2001 |
| JP | 2003-532925 | 11/2003 |
| JP | 2007-045849 | 2/2007 |

OTHER PUBLICATIONS

U.S. Appl. No. 13/495,032, filed Jun. 13, 2012, Saito et al.
International Search Report issued Apr. 5, 2011 in PCT/JP2011/054188 filed Feb. 24, 2011.
Extended Search Report issued Jul. 11, 2013, in European patent application No. 11747475.

* cited by examiner

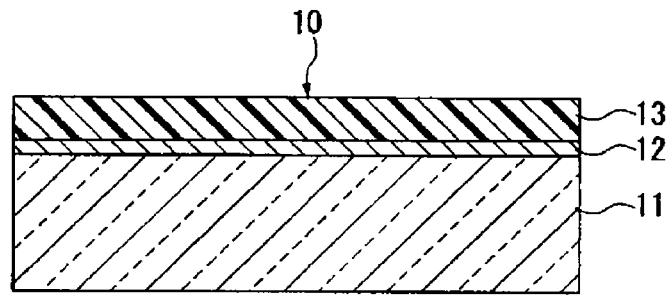

COATING COMPOSITION FOR SOLAR HEAT-COLLECTING REFLECTOR, AND SOLAR HEAT-COLLECTING REFLECTOR AND PROCESS FOR ITS PRODUCTION

TECHNICAL FIELD

The present invention relates to a coating composition for back coating to be used for the production of a solar heat-collecting reflector, and a solar heat-collecting reflector formed by the coating composition for back coating and a process for its production.

BACKGROUND ART

In recent years, from the viewpoint of global environment problems, there have been many attempts to suppress use of fossil fuels, and as one of them, a solar heat-collecting system which utilizes solar heat is known. As such a solar heat-collecting system, for example, a solar heat-collecting system may be mentioned which comprises a heat collection tube provided with a heat medium such as water or an inorganic salt, and a reflector to reflect sunlight to collect it in the heat collection tube. In such a solar heat-collecting system, sunlight is reflected by the reflector and collected in the heat collection tube, and the heat medium in the heat collection tube is heated by the heat of such sunlight to obtain thermal energy.

Whereas, as a mirror which is commonly used indoors, a mirror is widely used which comprises a glass substrate, a reflective metal layer formed on the glass substrate and an anti-corrosive coating film layer formed on such a reflective metal layer. In such a mirror, corrosion and modification of the reflective metal layer are prevented by the glass substrate and the anti-corrosive coating film layer. As back coating materials to form the anti-corrosive coating film layer, the following compositions are, for example, disclosed.

(i) A coating composition for back coating comprising a molybdenum compound as a lead-free pigment, and a synthetic resin binder (Patent Document 1).

(ii) A coating composition for back coating comprising a metal salt such as a thiazole type metal salt, an azole type or diamine type compound, and a synthetic resin (Patent Document 2).

The back coating materials (i) and (ii) are advantageous from the environmental viewpoint, since substantially no lead-type pigment will thereby be contained in the anti-corrosive coating film layer. However, with the anti-corrosive coating film layers formed by the back coating materials (i) and (ii), no consideration is made with respect to such a severe environment of usage as a solar heat-collecting reflector is exposed outdoors for a long period of time. The following problems will result when a solar-heat collecting reflector is used outdoors for a long period of time.

(1) The anti-corrosive coating film layer is detached from the reflective metal layer by expansion or shrinkage by heat, or expansion by moisture absorption or water absorption, of the anti-corrosive coating film layer.

(2) The reflective metal layer is oxidized by moisture absorption or water absorption of the anti-corrosive coating film layer, whereby the reflectance of the reflector is deteriorated.

(3) The anti-corrosive coating film layer of a solar heat-collecting reflector is exposed in many cases, and therefore, the anti-corrosive coating film layer is likely to be deteriorated by sunlight or impingement of sand or the like.

That is, the anti-corrosive coating film layer of a solar heat-collecting reflector is required to be excellent in durability such as heat resistance, moisture resistance, water resistance, etc. to solve the problems (1) and (2), and excellent in weather resistance, scratch resistance and impact resistance to solve the problem (3).

Patent Document 2 discloses that a fluororesin is used as a synthetic resin binder to provide the durability required for the anti-corrosive coating film layer. However, simply by using a fluororesin, it is difficult to sufficiently increase the durability, weather resistance, scratch resistance and impact resistance of the anti-corrosive coating film layer, and it is difficult to solve the problems (1) to (3).

PRIOR ART DOCUMENTS

Patent Documents

Patent Document 1: JP-A-2007-45849
Patent Document 2: JP-A-10-33333

DISCLOSURE OF INVENTION

Technical Problem

It is an object of the present invention to provide a coating composition for back coating to be used for the production of a solar heat-collecting reflector, whereby a cured coating film layer can be formed which is excellent in durability such as heat resistance or water resistance and excellent in weather resistance, scratch resistance and impact resistance.

Further, another object of the present invention is to provide a solar heat-collecting reflector having a cured coating film layer which is excellent in durability such as heat resistance or water resistance and also excellent in weather resistance, scratch resistance and impact resistance, and a process for its production.

Solution to Problem

In order to solve the above problems, the present invention has adopted the following constructions.

[1] A coating composition for back coating to be used for the production of a solar heat-collecting reflector, which comprises a fluoropolymer (A) having units (A1) derived from a fluoroolefin and units (A2) having a crosslinkable group.

[2] The coating composition for back coating according to the above [1], wherein the units (A2) having a crosslinkable group are units derived from a monomer (a2) having a crosslinkable group.

[3] The coating composition for back coating according to the above [1] or [2], wherein the units (A1) derived from a fluoroolefin are units derived from at least one fluoroolefin selected from the group consisting of tetrafluoroethylene, chlorotrifluoroethylene, hexafluoropropylene, vinylidene fluoride and vinyl fluoride.

[4] The coating composition for back coating according to any one of the above [1] to [3], wherein the crosslinkable group is at least one crosslinkable group selected from the group consisting of a hydroxy group, a carboxy group, an amino group, an epoxy group, an alkoxysilyl group and an isocyanate group.

[5] The coating composition for back coating according to any one of the above [1] to [4], wherein the fluoropolymer (A) is a polymer having at least one crosslinkable group selected from an alkoxysilyl group and a hydroxy group.

[6] The coating composition for back coating according to any one of the above [1] to [5], which comprises the fluoropolymer (A) and a curing agent (B).

[7] The coating composition for back coating according to the above [6], wherein the fluoropolymer (A) is a polymer having at least one crosslinkable group selected from an alkoxysilyl group and a hydroxy group, and the curing agent (B) is a metal alkoxide (B-1).

[8] The coating composition for back coating according to the above [6], wherein the fluoropolymer (A) is a polymer having a hydroxy group, and the curing agent (B) is at least one curing agent selected from the group consisting of an isocyanate type curing agent (B-2), a blocked isocyanate type curing agent (B-3) and an amino resin (B-4).

[9] The coating composition for back coating according to any one of the above [1] to [8], which contains at least one pigment (C) selected from the group consisting of an anti-corrosive pigment, a coloring pigment and an extender pigment.

[10] A process for producing a solar heat-collecting reflector, which comprises forming a layer of the coating composition for back coating as defined in any one of the above [1] to [9] on the side having a reflective metal layer, of a transparent substrate having the reflective metal layer on one side, and then curing the coating composition to form a cured coating film layer.

[11] A solar heat-collecting reflector having a transparent substrate, a reflective meal layer and a cured coating film layer laminated in the order of the transparent substrate, the reflective meal layer and the cured coating film layer, wherein the cured coating film layer is a cured coating film layer formed from the coating composition for back coating as defined in any one of the above [1] to [9].

[12] The solar heat-collecting reflector according to the above [11], wherein the transparent substrate is a glass substrate.

[13] The solar heat-collecting reflector according to the above [11] or [12], which has an anti-corrosive coating film layer between the reflective metal layer and the cured coating film layer.

[14] The solar heat-collecting reflector according to the above [13], wherein the anti-corrosive coating film layer is a layer formed from a back coating material.

Advantageous Effects of Invention

By using the coating composition for back coating for a solar heat-collecting reflector of the present invention, it is possible to form a cured coating film layer excellent in durability such as heat resistance or water resistance and also excellent in weather resistance, scratch resistance and impact resistance, as a cured coating film layer in a solar heat-collecting reflector.

Further, the solar heat-collecting reflector of the present invention has a cured coating film layer excellent in durability such as heat resistance or water resistance and also excellent in weather resistance, scratch resistance and impact resistance.

Further, by the process for producing a solar heat-collecting reflector of the present invention, it is possible to obtain a solar heat-collecting reflector having a cured coating film layer excellent in durability such as heat resistance or water resistance and also excellent in weather resistance, scratch resistance and impact resistance.

BRIEF DESCRIPTION OF DRAWING

FIG. 1 is a cross-sectional view illustrating an embodiment of the solar heat-collecting reflector of the present invention.

DESCRIPTION OF EMBODIMENTS

[Coating Composition for Back Coating for Solar Heat-Collecting Reflector]

The coating composition for back coating for the solar heat-collecting reflector of the present invention (hereinafter sometimes referred to simply as "the coating composition") is a coating composition for back coating to form a cured coating film layer on the back surface of the solar heat-collecting reflector and comprises a fluoropolymer (A) having units (A1) derived from a fluoroolefin and units (A2) having a crosslinkable group. In the present invention, polymerized units formed by polymerization of a monomer and units formed by chemical conversion (hereinafter referred to as functional group conversion) of some or all of functional groups of polymerized units formed by polymerization of a monomer, to other functional groups, are generally referred to as "units".

Further, in this specification, the term (meth)acrylic acid represents at least one of acrylic acid and methacrylic acid.

[Fluoropolymer (A)]

In the present invention, the fluoropolymer (A) is a fluoropolymer which is reacted with the after-described curing agent (B) to form a crosslinked structure, and thereby cured to form a coating film. Further, in a case where the fluoropolymer (A) has the after-described alkoxysilyl group, even if no curing agent is present, the alkoxysilyl groups may be condensed to one another to form a crosslinked structure for curing. The fluoropolymer (A) comprises units (A1) derived from a fluoroolefin and units (A2) having a crosslinkable group.

(Units (A1))

The units (A1) are units derived from a fluoroolefin.

The fluoroolefin is a compound having at least one hydrogen atom in an olefin hydrocarbon (general formula: $C_nH_{2n}$) substituted by a fluorine atom.

The number of carbon atoms in the fluoroolefin is preferably from 2 to 8, more preferably from 2 to 6.

The number of fluorine atoms in the fluoroolefin (hereinafter referred to as "the fluorine addition number" is preferably at least 2, more preferably from 3 to 4. When the fluorine addition number is at least 2, the weather resistance of the cured coating film will be improved. In the fluoroolefin, at least one hydrogen atom not substituted by a fluorine atom may be substituted by a chlorine atom.

The fluoroolefin is preferably tetrafluoroethylene, chlorotrifluoroethylene, hexafluoropropylene, vinylidene fluoride or vinyl fluoride, and tetrafluoroethylene or chlorotrifluoroethylene is more preferred.

As the fluoroolefin, one type may be used alone, or two or more types may be used in combination.

Units (A1) derived from a fluoroolefin are preferably units derived from at least one fluoroolefin selected from the group consisting of tetrafluoroethylene, chlorotrifluoroethylene, hexafluoropropylene, vinylidene fluoride and vinyl fluoride.

(Units (A2))

The units (A2) are units having a crosslinkable group.

The crosslinkable group is preferably at least one member selected from the group consisting of a hydroxy group, a carboxy group, an amino group, an epoxy group, an alkoxysilyl group and an isocyanate group. A hydroxy group or an alkoxysilyl group is more preferred, since it is thereby easy to satisfy excellent durability, weather resistance, scratch resistance and impact resistance.

The units (A2) may, for example, be the following units (A2-1) and units (A2-2).

Units (A2-1): Units derived from a monomer (a2) having a crosslinkable group.

Units (A2-2): Units having a crosslinkable group, which are formed by a functional group conversion of a polymer. That is, they are units which are formed by a method wherein a polymer comprising units having a reactive functional group is reacted with a compound having a crosslinkable group and a functional group reactive to bond with the reactive functional group, thereby to convert the reactive functional group to the crosslinkable group.

Units (A2-1):

A monomer (a2) to form units (A2-1) is a compound having a crosslinkable group as well as a polymerizable reactive group. The polymerizable reactive group is preferably an ethylenic unsaturated group such as a vinyl group, an allyl group or a (meth)acryloyl group. That is, the monomer (a2) is preferably a compound having a crosslinkable group and an ethylenic unsaturated group.

The number of carbon atoms in the monomer (a2) is preferably from 2 to 10, more preferably from 3 to 6.

The monomer (a2) may have an ether bond, an ester bond, an urethane bond or an amide bond in a carbon-carbon bond other than the double bond of the ethylenic unsaturated bond. Further, the monomer (a2) may be in the form of a straight chain or a branched chain.

As the monomer (a2), the following monomers (a2-1) to (a2-6) may, for example, be mentioned.

Monomer (a2-1): Hydroxy group-containing monomer
Monomer (a2-2): Carboxy group-containing monomer
Monomer (a2-3): Alkoxysilyl group-containing monomer
Monomer (a2-4): Amino group-containing monomer
Monomer (a2-5): Epoxy group-containing monomer
Monomer (a2-6): Isocyanate group-containing monomer The monomer (a2-1) may, for example, be a hydroxyalkyl vinyl ether such as 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether or 6-hydroxyhexyl vinyl ether; an ethylene glycol monovinyl ether such as diethylene glycol monovinyl ether, triethylene glycol monovinyl ether or tetraethylene glycol monovinyl ether; a hydroxyalkyl allyl ether such as hydroxyethyl allyl ether, hydroxypropyl allyl ether, 2-hydroxyethyl allyl ether, 4-hydroxybutyl allyl ether or glycerol monoallyl ether; a hydroxyalkyl vinyl ester such as hydroxyethyl vinyl ester or hydroxybutyl vinyl ester; a hydroxyalkyl allyl ester, such as hydroxyethyl allyl ester or hydroxybutyl allyl ester; or a (meth)acrylic acid hydroxyalkyl ester such as hydroxyethyl (meth)acrylate.

As the monomer (a2-1), one type may be used alone, or two or more types may be used in combination.

The monomer (a2-2) may, for example, be an unsaturated carboxylic acid such as 3-butenoic acid, 4-pentenoic acid, 2-hexenoic acid, 3-hexenoic acid, 5-hexenoic acid, 2-heptenoic acid, 3-heptenoic acid, 6-heptenoic acid, 3-optenoic acid, 7-optenoic acid, 2-nonenoic acid, 3-nonenoic acid, 8-nonenoic acid, 9-decenoic acid, 10-undecenoic acid, acrylic acid, methacrylic acid, vinyl acetic acid, crotonic acid, or cinnamic acid; a saturated carboxylic acid vinyl ether such as vinyloxy valeric acid, 3-vinyloxy propionic acid, 3-(2-vinyloxy butoxycarbonyl)propionic acid, or 3-(2-vinyloxy ethoxycarbonyl)propionic acid; a saturated carboxylic acid allyl ether such as allyloxy valeric acid, 3-allyloxy propionic acid, 3-(2-allyloxy butoxycarbonyl)propionic acid or 3-(2-allyloxy ethoxycarbonyl)propionic acid; a carboxylic acid vinyl ether such as 3-(2-vinyloxy ethoxycarbonyl)propionic acid or 3-(2-vinyloxy butoxycarbonyl)propionic acid; a saturated polybasic carboxylic acid monovinyl ester such as monovinyl adipate, monovinyl succinate, vinyl phthalate or vinyl pyromellitate; an unsaturated dicarboxylic acid or its intramolecular acid anhydride, such as itaconic acid, maleic acid, fumaric acid, maleic anhydride or itaconic anhydride; or an unsaturated carboxylic acid monoester such as itaconic acid monoester, fumaric acid monoester or maleic acid monoester.

Further, the monomer (a2-2) may be a monomer obtainable by reacting a compound having an acid anhydride group with the monomer (a2-1).

As the monomer (a2-2), one type may be used alone, or two or more types may be used in combination.

The monomer (a2-3) may, for example, be an acrylic acid ester or a methacrylic acid ester, such as $CH_2=CHCO_2(CH_2)_3Si(OCH_3)_3$, $CH_2=CHCO_2(CH_2)_3Si(OC_2H_5)_3$, $CH_2=C(CH_3)CO_2(CH_2)_3Si(OCH_3)_3$, $CH_2=C(CH_3)CO_2(CH_2)_3Si(OC_2H_5)_3$, $CH_2=CHCO_2(CH_2)_3SiCH_3(OC_2H_5)_2$, $CH_2=C(CH_3)CO_2(CH_2)_3SiC_2H_5(OCH_3)_2$, $CH_2=C(CH_3)CO_2(CH_2)_3Si(CH_3)_2(OC_2H_5)$, $CH_2=C(CH_3)CO_2(CH_2)_3Si(CH_3)_2OH$, $CH_2=CH(CH_2)_3Si(OCOCH_3)_3$, $CH_2=C(CH_3)CO_2(CH_2)_3SiC_2H_5(OCOCH_3)_2$, $CH_2=C(CH_3)CO_2(CH_2)_3SiCH_3(N(CH_3)COCH_3)_2$, $CH_2=CHCO_2(CH_2)_3SiCH_3[ON(CH_3)C_2H_5]_2$ or $CH_2=C(CH_3)CO_2(CH_2)_3SiC_6H_5[ON(CH_3)C_2H_5]_2$; a vinyl silane such as $CH_2=CHSi[ON=C(CH_3)(C_2H_5)]_3$, $CH_2=CHSi(OCH_3)_3$, $CH_2=CHSi(OC_2H_5)_3$, $CH_2=CHSiCH_3(OCH_3)_2$, $CH_2=CHSi(OCOCH_3)_3$, $CH_2=CHSi(CH_3)_2(OC_2H_5)$, $CH_2=CHSi(CH_3)_2SiCH_3(OCH_3)_2$, $CH_2=CHSiC_2H_5(OCOCH_3)_2$, $CH_2=CHSiCH_3[ON(CH_3)C_2H_5]_2$, vinyl trichlorosilane, or a partial hydrolyzate thereof; or a vinyl ether such as trimethoxysilylethyl vinyl ether, triethoxysilylethyl vinyl ether, trimethoxysilylbutyl vinyl ether, methyldimethoxysilylethyl vinyl ether, trimethoxysilylpropyl vinyl ether or triethoxysilylpropyl vinyl ether.

Further, the monomer (a2-3) may be a monomer obtainable by reacting a compound having an alkoxysilyl group and a functional group reactive with a hydroxy group, with the monomer (a2-1). For example, a monomer (a2-3A) having an alkoxysilyl group may be mentioned which is obtainable by a reaction of a hydroxy group of the monomer (a2-1) with a compound represented by the following formula (1) (hereinafter referred to as "the compound (1)".

$OCN(CH_2)_qSiX_pR^1_{3-p}$      (1)

(In the above formula (1), $R^1$ is a hydrogen atom or a $C_{1-10}$ monovalent hydrocarbon group, X is a $C_{1-5}$ alkoxy group, p is an integer of from 1 to 3, and q is an integer of from 1 to 5.)

By the reaction of the hydroxy group of the monomer (a2-1) with the compound (1), a urethane bond (—NHC(=O)—) is formed thereby to obtain a monomer (a2-3A) having a group represented by the formula —NHC(=O)(CH_2)_qSiX_pR_{3-p}$.

In the compound (1), $R^1$ is a hydrogen atom or a $C_{1-10}$ monovalent hydrocarbon group. When the number of carbon atoms in the monovalent hydrocarbon group in $R^1$ is at most 10, the compound (1) is prevented from becoming too bulky, whereby it is easy to prevent deterioration of the condensation reaction of the alkoxy group (X) during the curing of the coating film by a steric hindrance. Therefore, the curing property of the coating film will be good, and it becomes easy to obtain excellent durability, weather resistance, scratch resistance and impact resistance.

$R^1$ is preferably a $C_{1-10}$ monovalent hydrocarbon group, more preferably a $C_{1-5}$ monovalent hydrocarbon group, particularly preferably a methyl group or an ethyl group.

X is a $C_{1-5}$ alkoxy group, preferably an ethoxy group or a methoxy group. When the number of carbon atoms in X is at most 5, the alcohol component to be formed by the crosslinking reaction with the curing agent (B) tends to be readily volatile. Therefore, it becomes easy to prevent deterioration of the durability such as heat resistance, water resistance or moisture resistance, the weather resistance, the scratch resistance and the impact resistance by an alcohol component remaining in a cured coating film layer after the curing.

p is an integer of from 1 to 3, preferably 3.

q is an integer of from 1 to 5, preferably from 2 to 4.

Specific examples of the compound (1) include 3-isocyanate propyltrimethoxysilane (X=methoxy group, p=3, and q=3), 2-isocyanate propyltriethoxysilane (X=ethoxy group, p=3, and q=3), 3-isocyanate propylmethyldimethoxysilane (X=methoxy group, $R^1$=methyl group, p=2, and q=3), 3-isocyanate propylmethyldiethoxysilane (X=ethoxy group, $R^1$=methyl group, p=2, and q=3), 3-isocyanate propyldimethylmethoxysilane (X=methoxy group, $R^1$=methyl group, p=1, and q=3), 3-isocyanate propyldimethylethoxysilane (X=ethoxy group, $R^1$=methyl group, p=1, and q=3), 4-isocyanate butyltrimethoxysilane (X=methoxy group, p=3, and q=4), 4-isocyanate butyltriethoxysilane (X=ethoxy group, p=3, and q=4), 2-isocyanate ethyltrimethoxysilane (X=methoxy group, p=3, and q=2), and 2-isocyanate ethyltriethoxysilane (X=ethoxy group, p=3, and q=2).

From the viewpoint of availability, the compound (1) is preferably 3-isocyanate propyltrimethoxysilane or 3-isocyanate propyltriethoxysilane.

As the compound (1), one type may be used alone, or two or more types may be used in combination.

The monomer (a2-3A) can be obtained by reacting the monomer (a2-1) with the compound (1) in a solvent not having active hydrogen reactive with an isocyanate group of the compound (1) (e.g. ethyl acetate, methyl ethyl ketone or xylene).

The ratio of the compound (1) to the monomer (a2-1) is such that the compound (1) is preferably from 0.1 to 10 mol, more preferably from 0.5 to 5 mol, per 1 mol of the hydroxy group. When the compound (1) is at least 0.1 mol per 1 mol of the hydroxy group, curing tends to easily proceed during the formation of a cured coating film layer as the amount of the alkoxysilyl group increases. When the compound (1) is at most 10 mol per 1 mol of the hydroxy group, an unreacted compound (1) can easily be prevented from remaining in a substantial amount in the cured coating film layer, whereby the durability, weather resistance, scratch resistance and impact resistance of the cured coating film layer will be improved.

The reaction of the hydroxy group of the monomer (a2-1) with the isocyanate group of the compound (1) can be carried out in a yield of substantially 100%, but in order to further increase the reaction rate, the reaction may be carried out in a state where the compound (1) is excessive. In such a case, after removing the compound (1) from the reaction product, the polymerization reaction may be carried out to produce the fluoropolymer (A), or the polymerization reaction may be carried out in such a state that the reaction product contains an unreacted compound (1), to produce the fluoropolymer (A).

The reaction temperature for the reaction of the monomer (a2-1) with the compound (1) is preferably from room temperature to 100° C., more preferably from 50 to 70° C. Further, such a reaction is preferably carried out in an inert atmosphere such as in a nitrogen atmosphere. The reaction time may suitably be changed depending upon the progress of the reaction, and is preferably from 1 to 24 hours, more preferably from 3 to 8 hours. In the reaction system, an organic metal catalyst such as an organic tin compound, an organic aluminum compound, an organic zirconium compound or an organic titanate compound, may preferably be present for the purpose of accelerating the reaction.

Further, the monomer (a2-3) may be a monomer obtainable by reacting a compound having an alkoxysilyl group and a functional group reactive with a carboxy group, with the monomer (a2-2). For example, a monomer may be mentioned which is obtained by reacting a compound having an isocyanate group of the compound (1) substituted by an epoxy group, a hydroxy group or an amino group, with the monomer (a2-2).

As the monomer (a2-3), one type may be used alone, or two or more types may be used in combination.

The monomer (a2-4) may, for example, be an aminovinyl ether represented by $CH_2=C-O-(CH_2)_x-NH_2$ (x=0 to 10); an allyl amine represented by $CH_2=CH-O-CO(CH_2)_y-NH_2$ (y=1 to 10); aminomethyl styrene, vinyl amine, acrylamide, vinyl acetamide, or vinyl formamide.

As the monomer (a2-4), one type may be used alone, or two or more types may be used in combination.

The monomer (a2-5) may, for example, be glycidyl vinyl ether, glycidyl methacrylate, 3,4-epoxycyclohexylmethyl methacrylate, 3,4-epoxycyclohexylmethyl vinyl ether or 4-vinyloxymethylcyclohexylglycidyl ether.

As the monomer (a2-5), one type may be used alone, or two or more types may be used in combination.

The monomer (a2-6) may, for example, be 2-isocyanate ethyl methacrylate, 2-isocyanate ethyl acrylate, 2-isocyanate ethylethoxy methacrylate or 2-isocyanate ethyl vinyl ether.

As the monomer (a2-6), one type may be used alone, or two or more types may be used in combination.

The monomer (a2) is preferably the monomer (a2-1) or the monomer (a2-3), more preferably a hydroxyalkyl vinyl ether, an ethylene glycol monovinyl ether or the monomer (a2-3A), further preferably 2-hydroxyethyl vinyl ether, 4-hydroxybutyl vinyl ether, diethylene glycol monovinyl ether or the monomer (a2-3A), since the mutual copolymerizability with a fluoroolefin is excellent, and the durability, weather resistance, scratch resistance and impact resistance of the cured coating film layer to be formed, will be improved.

Units (A2-2):

The units (A2-2) are units to be formed by a functional group conversion of a polymer. A polymer having units (A2-2) can be obtained by a method wherein a monomer having a reactive functional group is copolymerized with e.g. a fluoroolefin to produce a polymer having a reactive functional group, and then to the reactive functional group in the polymer, a compound having a crosslinkable group and a functional group reactive to bond with the reactive functional group, is reacted to convert the reactive functional group to the crosslinkable group.

The reactive functional group of the monomer having the reactive functional group is preferably a hydroxy group, a carboxy group, an amino group, an epoxy group or an isocyanate group. Among them, a hydroxy group or a carboxy group is preferred, and a hydroxy group is particularly preferred. The monomer having a reactive functional group may, for example, be the above-mentioned monomer (a2-1), the monomer (a2-2), the monomer (a2-4), the monomer (a2-5) or the monomer (a2-6).

The functional group in the compound having a crosslinkable group and a functional group reactive to bond with the reactive functional group may, for example, be an isocyanate group, a carboxy group or its reactive derivative group (such as a halocarbonyl group) or an epoxy group, when the reactive functional group is a hydroxy group. When the reactive functional group is a carboxy group, an isocyanate group, an amino group or an epoxy group may, for example, be mentioned. When the reactive functional group is an amino group, an isocyanate group, a carboxy group or an epoxy group may, for example, be mentioned. When the reactive functional group is an isocyanate group, a hydroxy group, a carboxy group, an amino group or an epoxy group, may, for example, be mentioned. The crosslinkable group in the compound having a crosslinkable group and a functional group reactive to bond with the reactive functional group, may be the above-mentioned crosslinkable group. However, the crosslinkable group and the functional group reactive to bond with the reactive functional group, are required to be a non-reactive combination.

The compound having a crosslinkable group and a functional group reactive to bond with the reactive functional group may be a compound which reacts with the reactive functional group of a polymer to form a crosslinkable group anew. For example, a dicarboxylic acid anhydride is a compound which reacts with e.g. a hydroxy group to form a carboxy group (crosslinkable group).

For example, in a case where a polymer having an alkoxysilyl group as a crosslinkable group, is produced by a functional group conversion from a polymer having a hydroxy group, the production can be carried out by reacting a compound having an alkoxysilyl group and an isocyanate group. As the compound having an alkoxysilyl group and an isocyanate group, the above compound (1) is preferred. The reaction for such a functional group conversion can be carried out in the same manner as the above reaction of the hydroxyl group of the monomer (a2-1) with the compound (1). Otherwise, a polymer having an alkoxysilyl group can be likewise produced by reacting a compound having, instead of the isocyanate group of the above compound (1), a functional group reactive with the hydroxy group, such as a carboxy group or its reactive derivative group, or an epoxy group.

Further, by using the compound (1), a polymer having an alkoxysilyl group can be produced by a functional group conversion in the same manner as described above, from e.g. a polymer having a carboxyl group, a polymer having an amino group, or a polymer having an epoxy group.

Further, the functional group conversion can be carried out by using, instead of the above compound (1), a reactive compound having a crosslinkable group other than an alkoxysilyl group. For example, by reacting a polybasic carboxylic acid anhydride to a polymer having a hydroxy group, the hydroxy group can be converted to a carboxy group.

By the above functional group conversion, all of reactive functional groups in a polymer may be converted, or some of them may be converted. For example, it is possible to convert some of hydroxy groups in the polymer having hydroxy groups to carboxy group, to produce a polymer having hydroxy groups and carboxy groups.

The units (A2) may have a fluorine atom. That is, at least one hydrogen atom bonded to carbon atoms constituting the units (A2) may be substituted by a fluorine atom.

The units (A2) contained in the fluoropolymer (A) may be of one type, or of two or more types.

(Units (A3))

In the present invention, the fluoropolymer (A) may optionally contain, in addition to the units (A1) and (A2), units (A3) being units other than the units (A1) and (A2). A monomer (a3) capable of forming units (A3) is a monomer other than the above-mentioned fluoroolefin and the monomer (a2). As the monomer (a3), a monomer not containing the above crosslinkable group or reactive functional group, is preferred.

As the monomer (a3), a monomer (a3-1) is preferred which is copolymerizable with a fluoroolefin and the monomer (a2) and which is capable of providing a function to improve the adhesion between the cured coating film layer and a layer on which the cured coating film layer is formed (such as a reflective metal layer) in a solar heat-collecting reflector.

The monomer (a3-1) is preferably a vinyl ether, a vinyl ester or an allyl ether.

Specifically, a preferred monomer (a3-1) may, for example, be a vinyl ester such as vinyl acetate, vinyl pivalate or vinyl benzoate; a vinyl ether such as ethyl vinyl ether, butyl vinyl ether, 2-ethylhexyl vinyl ether, or cyclohexyl vinyl ether; or an allyl ether such as ethyl allyl ether, butyl allyl ether, or cyclohexyl allyl ether.

Further, as the monomer (a3) other than the monomer (a3-1), an olefin such as ethylene or isobutylene is preferred with a view to improving the solubility in a solvent, etc.

As the monomer (a3), one type may be used alone, or two or more types may be used in combination.

The fluoropolymer (A) is a polymer which comprises the units (A1) and (A2) as the essential units and which optionally contains the units (A3) as the case requires. That is, as the fluoropolymer (A), it is possible to use one or both of a polymer comprising the units (A1) and (A2), and a polymer comprising the units (A1), (A2) and (A3).

The content of the units (A1) in the fluoropolymer (A) is preferably from 5 to 95 mol %, more preferably from 10 to 90 mol %, based on the total content of the units (A1) and (A2). When the content of the units (A1) is at least 5 mol %, the weather resistance of the cured coating film layer to be formed, will be improved. When the content of the units (A1) is at most 95 mol %, the compatibility with the after-described curing agent (B) will be good, and it is possible to form a dense cured coating film layer at the time of curing, and the heat resistance, moisture resistance, scratch resistance and impact resistance of the cured coating film layer to be formed, will be improved.

The content of the units (A2) in the fluoropolymer (A) is preferably from 5 to 95 mol %, more preferably from 10 to 90 mol %, based on the total content of the units (A1) and (A2). If the content of the units (A2) is at least 5 mol %, the crosslinking density with the after-described curing agent (B) will be high, and it is possible to form a dense cured coating film layer at the time of curing, and the heat resistance, moisture resistance, scratch resistance and impact resistance of the cured coating film layer to be formed, will be improved. When the content of the units (A2) is at most 95 mol %, the stability of the fluoropolymer (A) will be improved, and the pot life of the coating material composition will be improved.

From the viewpoint of the weather resistance, the content of the units (A1) in the fluoropolymer (A) is preferably from 5 to 95 mol %, more preferably from 10 to 90 mol %, particularly preferably from 15 to 85 mol %, based on the total of all units in the fluoropolymer (A).

Further, with a view to improving the heat resistance, moisture resistance, scratch resistance and impact resistance of the cured coating film by increasing the crosslinking density, the content of the units (A2) in the fluoropolymer (A) is preferably from 1 to 80 mol %, more preferably from 3 to 70 mol %, particularly preferably from 5 to 60 mol %, based on the total of all units in the fluoropolymer (A).

The content of the units (A3-1) in the fluoropolymer (A) is preferably from 0 to 60 mol %, more preferably from 0 to 50 mol %, based on the total of all units in the fluoropolymer (A). The units (A3) are an optional component, and the content of the units (A3-1) being 0 mol % means that the units (A3-1) are not contained. In a case where the units (A3-1) are contained, the lower limit of the content is more than 0 mol %, preferably 0.5 mol %. When the content of the units (A3-1) is at most 60 mol %, the weather resistance of the cured coating film layer will not decrease, and the adhesion to e.g. a reflective metal layer as the underlayer will be improved.

The contents of the respective units in the fluoropolymer (A) can be controlled by the feeding amounts of the respective monomers and the reaction conditions in the polymerization reaction to obtain the fluoropolymer (A).

(Methods for Producing Fluoropolymer (A))

The following methods ($\alpha$1) and ($\alpha$2) are preferred as methods for producing the fluoropolymer (A). The method ($\alpha$1) is a method for producing a fluoropolymer (A) having units (A2-1), and the method ($\alpha$2) is a method for producing a fluoropolymer (A) having units (A2-2).

($\alpha$1): A method of copolymerizing a fluoroolefin with the monomer (a2) and, as the case requires, the monomer (a3).

($\alpha$2): A method of copolymerizing at least one monomer selected from the group consisting of the monomer (a2-1), the monomer (a2-2), the monomer (a2-4), the monomer (a2-5) and the monomer (a2-6), with a fluoroolefin and, as the case requires, the monomer (a3), and then, reacting, to the obtained polymer a compound having a crosslinkable group and a functional group reactive to bond with the reactive functional group in the polymer.

Method ($\alpha$1):

For the copolymerization in the method ($\alpha$1), a known radical polymerization method may be employed. As its polymerization system, solution polymerization, suspension polymerization or emulsion polymerization may, for example, be employed.

The reaction temperature for the polymerization may vary depending upon a radical polymerization initiator to be used, but it is preferably from 0 to 130° C. The reaction time is preferably from 1 to 50 hours.

As the solvent, for example, ion-exchanged water; an alcohol solvent such as ethanol, butanol or propanol; a saturated hydrocarbon solvent such as n-hexane or n-heptane; an aromatic hydrocarbon solvent such as toluene or xylene; a ketone solvent such as methyl ethyl ketone or cyclohexanone; or an ester solvent such as ethyl acetate or butyl acetate, may, for example, be used.

As a radical polymerization initiator, for example, a peroxydicarbonate such as diisopropyl peroxy dicarbonate or di-n-propyl peroxy dicarbonate; a peroxy ester such as t-hexyl peroxy pivalate or t-butyl peroxy pivalate; a ketone peroxide such as cyclohexanone peroxide or methyl ethyl ketone peroxide; a peroxy ketal such as 1,1-bis(t-hexylperoxy)cyclohexane or 1,1-bis(t-butylperoxy)cyclohexane; a peroxy carbonate ester such as t-hexylperoxy-n-butyl carbonate or t-butylperoxy-n-propyl carbonate; a diacyl peroxide such as isobutyryl peroxide or lauroyl peroxide; or a dialkyl peroxide such as dicumyl peroxide or di-t-butyl peroxide, may, for example, be used.

In the case of emulsion polymerization, polymerization can be carried out in water in the presence of an anionic or nonionic emulsifier by using an initiator such as a water-soluble peroxide, a persulfate or a water-soluble azo compound.

During the polymerization reaction, a very small amount of hydrochloric acid or hydrofluoric acid may be formed, and therefore, at the time of polymerization, it is preferred that a buffer is preliminarily added.

Method ($\alpha$2):

The method ($\alpha$2) comprises the following steps ($\alpha$2-1) and ($\alpha$2-2).

Step ($\alpha$2-1): A step of copolymerizing at least one monomer selected from the group consisting of the monomer (a2-1), the monomer (a2-2), the monomer (a2-4), the monomer (a2-5) and the monomer (a2-6), with a fluoroolefin and, as the case requires, the monomer (a3).

Step ($\alpha$2-2): A step of reacting, to the polymer having a reactive functional group obtained in the step ($\alpha$2-1), a compound having a crosslinkable group and a functional group reactive to bond with the reactive functional group.

As the monomer to be copolymerized with the fluoroolefin in the step ($\alpha$2-1), the monomer (a2-1) or the monomer (a2-2) is preferred. As the compound having a crosslinkable group and a functional group reactive to bond with the reactive functional group in the polymer, the above compound (1) is preferred.

Now, as an example of the method ($\alpha$2), a case of using the monomer (a2-1) and the compound (1) will be described.

In the step ($\alpha$2-1), the copolymerization of the fluoroolefin, the monomer (a2-1) and, as the case requires, the monomer (a3) can be carried out by the same method as the copolymerization in the method ($\alpha$1).

Further, in the step ($\alpha$2-2), the reaction of the polymer obtained in the step ($\alpha$2-1) with the compound (1) can be carried out in the same method as the method for producing the above-mentioned monomer (a2-3A) except that such a polymer is employed instead of a monomer (a2-1).

In a case where the fluoropolymer (A) having an alkoxysilyl group is produced by using the compound (1), the production is preferably carried out by the method ($\alpha$2), whereby the production is easy. In the production by the method ($\alpha$1) wherein the monomer (a2-3A) is employed, it is required to severely control and adjust the polymerization conditions in order to prevent gelation during the production.

Further, the method for producing the fluoropolymer (A) is not limited to the above-described methods ($\alpha$1) and ($\alpha$2). For example, a fluoropolymer (A) having an alkoxysilyl group may be produced by reacting the compound (1) to a commercially available fluororesin such as "LUMIFLON" tradename (manufactured by Asahi Glass Company, Limited), "FLUONATE" tradename (manufactured by Dainippon Ink and Chemicals), "CEFRAL COAT" tradename (manufactured by Central Glass Co., Ltd.), "ZAFLON" tradename (manufactured by Toagosei Co., Ltd.) or "ZEFFLE" tradename (manufactured by Daikin Industries, Ltd.).

[Curing Agent (B)]

The curing agent (B) is reacted with the crosslinkable group of the fluoropolymer (A) to form a crosslinked structure thereby to perform a role of curing a coating layer having the coating composition applied. As the curing agent (B), depending upon the type of the curable group of the fluoropolymer (A), a compound having at least two functional groups having reactivity to the crosslinkable group, is suitably selected. As the curing agent, a metal alkoxide (B-1), an isocyanate type curing agent (B-2), a blocked isocyanate type curing agent (B-3) or an amino resin (B-4) is preferred.

In a case where the fluoropolymer (A) has a hydroxy group, as the curing agent (B), a metal alkoxide (B-1), an isocyanate type curing agent (B-2), a blocked isocyanate type curing agent (B-3) or an amino resin (B-4) is preferred.

In a case where the fluoropolymer (A) has a carboxy group, as the curing agent (B), an amine type curing agent or an epoxy type curing agent may, for example, be mentioned.

In a case where the fluoropolymer (A) has an amino group, as the curing agent (B), a carboxy group-containing curing agent, an epoxy type curing agent or an acid anhydride type curing agent may, for example, be mentioned.

In a case where the fluoropolymer (A) is an epoxy group, as the curing agent (B), a carboxy group-containing curing agent, an acid anhydride type curing agent or an amine type curing agent may, for example, be mentioned.

In a case where the fluoropolymer (A) has an alkoxysilyl group, as the curing agent (B), a metal alkoxide (B-1) is preferred.

In a case where the fluoropolymer (A) has an isocyanate group, as the curing agent (B), a hydroxy group-containing curing agent or a carboxy group-containing curing agent may, for example, be mentioned.

<Metal Alkoxide (B-1)>

As the metal or metalloid in the above metal alkoxide, Al, Ti or Si may, for example, be mentioned, and Si is preferred since a harder cured coating film layer can thereby be formed, as the durability such as heat resistance, moisture resistance or water resistance, the weather resistance, the scratch resistance and the impact resistance will be improved.

As the alkoxy group in the metal alkoxide, a $C_{1-10}$ alkoxy group is preferred, and a methoxy group or an ethoxy group is more preferred. A methoxy group is particularly preferred. As the metal alkoxide, a compound represented by the following formula (2) (hereinafter referred to as "the compound (2)") is preferred.

$$(R^2)_{4-k}Si(OR^3)_k \qquad (2)$$

(In the above formula (2), each of $R^2$ and $R^3$ which are independent of each other, is a $C_{1-10}$ monovalent hydrocarbon group, and k is an integer of from 2 to 4.)

The monovalent hydrocarbon group for $R^2$ may have a substituent. That is, some or all of hydrogen atoms in the monovalent hydrocarbon group for $R^2$ may be substituted by substituents. As such substituents, halogen atoms are preferred, and fluorine atoms are more preferred.

$R^2$ is preferably a methyl group, an ethyl group, a hexyl group, a decyl group, a phenyl group or a trifluoropropyl group. In a case where a plurality of $R^2$ are present in the compound (2), the plurality of $R^2$ are preferably the same from the availability of the raw material. However, the plurality of $R^2$ may be different from one another.

The monovalent hydrocarbon group for $R^3$ is a $C_{1-10}$ alkyl group, preferably a methyl group or an ethyl group, particularly preferably a methyl group. In a case where a plurality of $R^3$ are present in the compound (2), the plurality of $R^3$ are preferably the same from such a viewpoint that the reactivity of the alkoxy groups becomes the same, whereby it is easy to uniformly form a cured coating film layer. However, the plurality of $R^3$ may be different from one another.

In the compound (2), k is an integer of from 2 to 4, preferably from 3 to 4.

Specifically, the compound (2) may, for example, be a tetrafunctional alkoxysilane such as tetramethoxysilane, tetraethoxysilane or tetraisopropoxysilane; a trifunctional alkoxysilane such as methyltrimethoxysilane, methyltriethoxysilane, phenyltrimethoxysilane, phenyltriethoxysilane, hexyltrimethoxysilane, hexyltriethoxysilane, decyltrimethoxysilane, or trifluoropropyltrimethoxysilane; or a bifunctional alkoxysilane such as dimethyldimethoxysilane, diphenyldimethoxysilane, dimethyldiethoxysilane or diphenyldiethoxysilane. Among them, tetramethoxysilane, tetraethoxysilane, methyltrimethoxysilane, methyltriethoxysilane or phenyltrimethoxysilane is preferred from the viewpoint of the curing speed, and the physical properties of the obtainable cured coating film layer.

As the compound (2), one type may be used alone, or two or more types may be used in combination.

The compound (2) may be used in the form of a partially hydrolyzed condensate. Such a partially hydrolyzed condensate is a compound obtained by partially hydrolyzing and condensing the above compound (2) so that at least two hydrolyzable groups (—$OR^3$ groups) will remain in the molecule. The entire structure of such a partially hydrolyzed condensate is not clearly understood, but is a polysilicic acid ester comprising a skeleton composed of a —Si—O— bond and an alkoxy group, and such a skeleton may have a straight chain structure, a branched chain structure or a cyclic structure.

The poorer the condensation degree, the better for the partially hydrolyzed condensate of the compound (2). The lower the condensation degree of the partially hydrolyzed condensate, the better the compatibility with the fluoropolymer (A). Further, the thermal expansion coefficients of the cured coating film layer to be formed and the substrate layer on which the cured coating film is formed (such as a reflective metal layer) tend to be closer, and peeling of the cured coating film layer from the substrate due to expansion or shrinkage by heat is less likely to occur.

The method for producing the partially hydrolyzed condensate of the compound (2) is not particularly limited, and a known method for producing a partially hydrolyzed condensate may be employed. For example, a method may be mentioned wherein at least one of water, an acid and a solvent is added to the compound (2) to partially hydrolyze and condense it.

As the partially hydrolyzed condensate of the compound (2), ones different in the condensation degree, the structure and the type of the alkoxy groups, are commercially available. For example, condensates having an effective silica content of from about 28 to 70 mass %, such as "KR-500", "KR-510" and "KR-213" tradenames (manufactured by Shin-Etsu Chemical Co., Ltd.), "MKC Silicate MS51" and "MKC Silicate MS56" tradenames (manufactured by Mitsubishi Chemical Corporation), and "M Silicate 51", "Ethylsilicate 40" and "Ethylsilicate 45" tradenames (manufactured by Tama Chemicals Co., Ltd.), or ones having such condensates dissolved in ethanol or isopropanol, such as "HAS-1", "HAS-6" and "HAS-10" tradenames (manufactured by Colcoat Co., Ltd.) may, for example, be mentioned. The above "effective silica content" is a value representing the content of silica calculated as $SiO_2$, when the polyalkyl silicate contained in the product is regarded as 100 mass %.

As the partially hydrolyzed condensate of the compound (2), one type may be used alone, or two or more types may be used in combination.

The aluminum alkoxide may, for example, be aluminum isopropoxide ($Al[O—CH(CH_3)_2]_3$).

The titanium alkoxide may, for example, be titanium butoxide ($Ti(O—C_4H_9)_4$).

Further, such an aluminum alkoxide or titanium alkoxide may be partially hydrolyzed and condensed so that at least two hydrolyzable groups will remain in the molecule, and such a partially hydrolyzed condensate may be used. With such a partially hydrolyzed condensate, the lower the condensation degree, the better, from such a viewpoint that the compatibility with the fluoropolymer (A) is thereby improved, and peeling of the cured coating film layer from the substrate is less likely to occur.

<Isocyanate Type Curing Agent (B-2)>

The isocyanate type curing agent may, for example, be non-yellowing polyisocyanate or a non-yellowing polyisocyanate modified product.

The non-yellowing polyisocyanate may, for example, be an alicyclic polyisocyanate such as isophorone diisocyanate (IPDI) or dicyclohexylmethane diisocyanate (HMDI); or an aliphatic polyisocyanate such as hexamethylene diisocyanate (HDI).

As the non-yellowing polyisocyanate modified product, for example, the following modified products (b1) to (b4) may be mentioned.

(b1) An isocyanurate of an aliphatic diisocyanate or an alicyclic diisocyanate.

(b2) A modified product having a structure represented by —X—C(=O)—NH—, and having an aliphatic diisocyanate or an alicyclic diisocyanate modified with a polyol or a polyamine.

(b3) A modified product having a structure represented by —X—C(=O)—NH—, and having some of isocyanate groups in the isocyanurate of an aliphatic diisocyanate or an alicyclic diisocyanate modified with a polyol.

(b4) A modified product composed of a mixture of the modified product (b1) and the modified product (b2).

Here, X in —X—C(=O)—NH— is an organic group derived from a compound having a hydroxy group or a compound having an amino group. The compound having a hydroxy group or the compound having an amino group preferably has from 2 to 3 functional groups.

<Blocked Isocyanate Type Curing Agent (B-3)>

The blocked isocyanate type curing agent is a blocked isocyanate type curing agent having an isocyanate group of the above-mentioned isocyanate type curing agent (B-2) blocked. Blocking of the isocyanate group can be carried out e.g. epsilon caprolactam (E-CAP), methyl-ethyl ketone oxime (MEK-OX), methyl isobutyl ketone oxime (MIBK-OX), pyralidine or triazine (TA).

<Amino Resin (B-4)>

The amino resin may, for example, be a melamine resin, a guanamine resin, a sulfone amide resin, an urea resin or an aniline resin. Among them, a melamine resin is preferred in that the curing rate is high.

The melamine resin may specifically be an alkyl etherified melamine resin. Among them, a melamine resin substituted by a methoxy group and/or a butoxy group may be more preferably used.

The coating composition of the present invention may be a two-part coating composition which contains no curing agent (B) so that the curing agent (B) is added immediately before forming a cured coating film layer, or may be a one-part coating composition containing the fluoropolymer (A) and the curing agent (B) together. Further, in a case where the fluoropolymer (A) has alkoxysilyl groups, the curing agent (B) may not be contained, since the alkoxysilyl groups will undergo a condensation reaction to one another.

At the time of using the coating composition of the present invention, the content of the fluoropolymer (A) is preferably from 10 to 90 mass %, more preferably from 20 to 80 mass %, further preferably from 30 to 70 mass %, based on the total content of the fluoropolymer (A) and the curing agent (B).

When the content of the fluoropolymer (A) is at least 10 mass %, the weather resistance of the cured coating film layer will be improved. When the content of the fluoropolymer (A) is at most 90 mass %, it becomes easy to prevent cracking of the cured coating film layer, and the adhesion between the cured coating film and a layer on which the cured coating film layer is formed (such as a reflective metal layer) will be improved. Further, it becomes easy to form a cured coating film layer excellent in durability, scratch resistance and impact resistance.

The combination of the fluoropolymer (A) and the curing agent (B) in the coating composition of the present invention is preferably either (i) a coating composition wherein as the fluoropolymer (A), a fluoropolymer having a hydroxy group is employed, and as the curing agent (B), at least one member selected from an isocyanate type curing agent (B-2), a blocked isocyanate type curing agent (B-3) and an amino resin (B-4) is employed, or (ii) a coating composition wherein as the fluoropolymer (A), a fluoropolymer having at least one of an alkoxysilyl group and a hydroxy group, is employed, and as the curing agent (B), a metal alkoxide (B-1) is employed, from such a viewpoint that it is thereby easy to form a cured coating film layer having a higher hardness and better durability such as heat resistance or water resistance, weather resistance, abrasion resistance and impact resistance.

Further, in a case where the fluoropolymer (A) has alkoxysilyl groups, a coating composition containing no curing agent (B) may also be preferred, since alkoxysilyl groups will undergo a condensation reaction to one another.

[Pigment (C)]

The coating composition of the present invention preferably contains a pigment (C) for the purpose of corrosion prevention, coloring, reinforcement, etc. of the cured coating film layer.

As such a pigment (C), at least one pigment selected from the group consisting of an anti-corrosive pigment, a coloring pigment and an extender pigment is preferred.

The anti-corrosive pigment is a pigment to prevent corrosion or alteration of the reflective metal layer. A lead-free anti-corrosive pigment presenting little load to the environment is preferred. The lead-free anti-corrosive pigment may, for example, be zinc cyanamide, zinc oxide, zinc phosphate, calcium magnesium phosphate, zinc molybdate, barium borate or zinc calcium cyanamide.

The coloring pigment is a pigment to color the coating film. The coloring pigment may, for example, be titanium oxide, carbon black or iron oxide.

The extender pigment is a pigment to improve the hardness of the coating film and to increase the thickness of the coating film. The extender pigment may, for example, be talc, barium sulfate, mica or calcium carbonate.

The content of the pigment (C) in the coating composition of the present invention is preferably from 50 to 500 mass %, more preferably from 100 to 400 mass %, based on the total amount of the solid content in the coating composition during use (including the curing agent (B)). When the content of the pigment (C) is at least 50 mass %, the functions of the pigment (C) can easily be obtainable. When the content of the pigment (C) is at most 500 mass %, it tends to be less likely that the cured coating film layer is cracked or damaged by an impact of e.g. sand, and the weather resistance of the cured coating film will be improved.

[Curing Catalyst (D)]

Further, the coating composition of the present invention may contain a curing catalyst (D) for the purpose of accelerating the curing reaction or imparting good chemical properties and physical properties to a cured coating film layer as a cured product. Especially in order to cure the composition at a low temperature in a short time, it is preferred to incorporate the curing catalyst (D). As such a curing catalyst (D), for example, the following curing catalysts (D-1), (D-2) and (D-3) may be mentioned.

Curing catalyst (D-1): A curing catalyst to be used for a crosslinking reaction between a fluoropolymer containing a hydroxy group and an isocyanate type curing agent or a blocked isocyanate type curing agent.

Curing catalyst (D-2): A curing catalyst to be used for a crosslinking reaction between a fluoropolymer containing at least one of an alkoxysilyl group and a hydroxy group, and a metal alkoxide.

Curing catalyst (D-3): A curing catalyst to be used for a crosslinking reaction between a fluoropolymer containing a hydroxy group, and an amino resin.

As the curing catalyst (D-1), a tin catalyst such as tin octylate, tributyltin dilaurate or dibutyltin dilaurate is preferred.

The curing catalyst (D-2) may, for example, be an acidic phosphoric acid ester such as phosphoric acid monoester or phosphoric acid diester; and an acidic boric acid ester such as boric acid monoester or boric acid diester; an amine adduct such as an addition reaction product of an acidic phosphoric acid ester and an amine, or an addition reaction product of a carboxylic acid compound and an amine; a metal ester such as tin octylate, or dibutyltin dilaurate; a metal chelate such as aluminum tris(acetylacetonate), or zirconium tetrakis(acetyl acetonate); or a metal alkoxide such as aluminum isopropoxide or titanium butoxide. Among them, from the viewpoint of the curing property and smoothness of a cured coating film layer to be formed, an acidic phosphoric acid ester is preferred, and from the viewpoint of the curing property, and smoothness and water resistance, etc. of a cured coating film layer to be formed, a $C_{1-8}$ monoalkyl phosphate, a $C_{1-8}$ dialkyl phosphate or a mixture thereof is more preferred.

As the curing catalyst (D-3), a blocked acid catalyst is preferred. As the blocked acid catalyst, various amine salts of a carboxylic acid, sulfonic acid, phosphoric acid, etc. may be mentioned. Particularly preferred is a higher alkyl-substituted sulfonic acid amine salt, such as a diethanolamine salt or a triethylamine salt of p-toluene sulfonic acid or dodecylbenzene sulfonic acid.

As the curing catalyst (D), one type may be used alone, or two or more types may be used in combination.

The content of the curing catalyst (D) is preferably from 0.00001 to 10 mass % based on the total amount of the solid content in the coating composition at the time of use (including the curing agent (B)). When the content of the curing catalyst (D) is at least 0.00001 mass %, it will be easy to obtain the catalytic effects sufficiently. When the content of the curing catalyst (D) is at most 10 mass %, it is unlikely that a remaining curing catalyst (D) will adversely affect the cured coating film layer, and the heat resistance and water resistance will be improved.

[Resin (E)]

The coating composition of the present invention may contain a resin (E) other than the fluoropolymer (A).

The resin (E) may, for example, be a non-fluorine type resin such as an acryl resin, a polyester resin, an acryl polyol resin, a polyester polyol resin, an urethane resin, an acryl silicone resin, a silicone resin, an alkyd resin, an epoxy resin or an oxetane resin, or a fluororesin other than the fluoropolymer (A). The resin (E) may be a resin having a crosslinkable group which can be crosslinked by the curing agent (B) for curing.

In a case where the resin (E) is incorporated to the coating composition of the present invention, the content of the resin (E) is preferably from 1 to 200 parts by mass, per 100 parts by mass of the fluoropolymer (A).

[Component (F)]

The coating composition of the present invention may contain a component (F) other than the fluoropolymer (A), the curing agent (B), the pigment (C), the curing catalyst (D) and the resin (E).

The component (F) may, for example, be a silane coupling agent to improve the adhesion of the cured coating film layer; a photostabilizer such as a hindered amine type photostabilizer; an organic ultraviolet absorber such as a benzophenone type compound, a benzotriazole type compound, a triazine type compound or a cyanoacrylate type compound; an inorganic ultraviolet absorber such as titanium oxide, zinc oxide or cerium oxide; a delustering agent such as ultrafine synthetic silica; a nonionic, cationic or anionic surfactant; or a leveling agent.

The content of the component (F) may suitably be selected within a range not to impair the effects of the present invention.

[Solvent (G)]

The coating composition of the present invention is a composition comprising the above-described respective components to form a cured coating film layer. Further, in order to apply the coating composition of the present invention, it is also possible to use, together with the coating composition of the present invention, a component other than the components to form a cured coating film layer. Particularly, it is preferred to use a solvent (G) as mixed to the coating composition, in order to apply the coating composition. The composition containing the solvent (G) is applied to form a coating film of the coating composition containing the solvent, and then, the solvent (G) is removed to form a coating film of the coating composition.

As such a solvent (G), in order to apply the coating composition of the present invention, a solvent which has been commonly used, such as toluene, xylene, methyl ethyl ketone or butyl acetate, may be used, but from the viewpoint of reducing the environmental load, a weak solvent is preferred.

As such a weak solvent, a weak solvent which is useful at the time of solvent substitution or polymerization of the fluoropolymer (A) is preferred, and mineral spirit or mineral terpene is more preferred.

The content of the solvent (G) in the coating composition containing the solvent (G) may suitably be determined taking into consideration the solubility of the fluoropolymer (A), a proper viscosity, the coating method, etc. at the time of applying the composition as a coating material.

By using the coating composition of the present invention as described above, it is possible to form a hard cured coating film layer containing fluorine atoms and having a crosslinked structure, as a cured coating film layer for a solar heat-collecting reflector. Such a cured coating film layer has a crosslinked structure and thus is a hard coating film and has excellent scratch resistance and impact resistance, so that it to will not be damaged even by impingement of sand, etc. Further, such a cured coating film layer not only has an improved weather resistance as it contains fluorine atoms, but also is a hard coating film having a crosslinked structure, whereby the degree of expansion or shrinkage by heat tends to be small, moisture absorption and water absorption are suppressed, and the heat resistance, water resistance and moisture resistance are further improved.

[Solar Heat-Collecting Reflector]

The solar heat-collecting reflector of the present invention is a mirror to reflect sunlight in a solar heat-collecting system which collects solar heat and utilizes it as heat energy.

FIG. 1 is a cross-sectional view illustrating an embodiment of the solar heat-collecting reflector of the present invention (hereinafter referred to simply as "the reflector").

As shown in FIG. 1, the reflector 10 comprises a glass substrate 11, a reflective metal layer 12 formed on the glass substrate 11, and a cured coating film layer 13 formed on the reflective metal layer 12.

As the glass substrate 11, a known glass for a mirror may be used, and, for example, soda lime glass may be mentioned. The solar heat-collecting reflector may be used outdoors such as in the desert and is likely to be damaged by the impingement of sand, etc., and therefore, the glass substrate is preferably tempered glass.

The thickness of the glass substrate 11 is preferably from 0.5 to 10 mm.

The substrate for the solar heat-collecting reflector may be transparent substrate, and it is not limited to a glass substrate and may be a transparent substrate made of other material so long as it has transparency. As a transparent substrate other than a glass substrate, a transparent resin substrate is preferred. For example, a transparent resin substrate of e.g. an acryl resin, a polycarbonate resin, a polyester resin or a fluororesin may be mentioned. The thickness of the transparent resin substrate is preferably from 0.5 to 10 mm.

The shape of the transparent substrate is not limited to a plate member having a flat surface and may be a plate member or molded member having a curvature. The thickness of the plate member or molded member is preferably substantially constant. For example, a hemisphere, a semicylinder or a plate member having a paraboloidal surface may be mentioned, and the reflective surface thereof may be inside or outside of the curved surface.

The reflective metal layer 12 is a metal layer constituting a reflective surface for sunlight. The metal constituting the reflective metal layer 12 may, for example, be Ag or the like.

The thickness of the reflective metal layer 12 is preferably from 300 to 1,500 mg/m$^2$.

The cured coating film layer 13 is a layer to be formed to prevent corrosion and to improve the mechanical durability of the reflective metal layer 12, and it is formed by the coating composition of the present invention as described above.

The thickness of the cured coating film layer 13 is preferably from 10 to 150 μm.

From the viewpoint of the protection of the reflective metal layer, the cured coating film layer is formed outside of the reflective metal layer (the side opposite to the transparent substrate). Between the reflective metal layer and the cured coating film layer, another layer may be present. Such another layer may, for example, be a metal protective layer containing copper as the main component, for the purpose of protecting the reflective metal layer, a resin layer made of an alkyd resin, an epoxy resin or an acryl resin which has been commonly applied to the back surface of a reflective metal layer, or a layer made of a silane coupling agent in order to improve the adhesion of the cured coating film layer.

Between the reflective metal layer and the cured coating film layer, it is preferred to provide a layer specialized to protect the reflective metal layer. As the layer specialized to protect the reflective metal layer, an anticorrosive film layer or the above-mentioned metal protective layer is preferred. As the coating material to form the anti-corrosive coating film layer, a coating material so-called a back coating material is available. By using a back coating material, an anti-corrosive coating film layer can be formed on the reflective metal layer. The back coating material is preferably a coating material comprising a metal compound to impart rust-preventing properties or corrosion-preventing properties and a resin binder such as an alkyd resin, an epoxy resin or an acryl resin. Specifically, the back coating materials disclosed in the above-mentioned Patent Documents 1 and 2 may, for example, be mentioned.

[Process for Producing Solar Heat-Collecting Reflector]

The reflector of the present invention can be produced by a known process except that the coating composition of the present invention is employed. Now, a process for producing the above reflector 10 will be described as an example of the process for producing a reflector of the present invention.

The process for producing the reflector 10 may be a process which comprises forming a coating layer by applying the coating composition of the present invention on the side having a reflective metal layer 12, of a glass substrate 11 having the reflective metal layer 12, followed by curing to form a cured coating film layer.

As a method for forming the reflective metal layer 12 on the glass substrate 11, an electroless plating method, a vacuum vapor deposition method or a sputtering method may, for example, be mentioned. In a case where an anti-corrosive coating film layer is to be formed on the reflective metal layer 12, by using the back coating material, the anti-corrosive coating film layer may be formed by a usual method.

The application of the coating composition containing the solvent (G) may be carried out by means of e.g. a brush, a roller, a spray, a flow coater or an applicator. The application of the coating composition not containing the solvent (G), such as a powdery coating material, may be carried out by means of e.g. a powder spray. The amount of application of the coating composition may suitably be selected, so that the dried film thickness will be within the above-mentioned range. The temperature at the time of heat curing the coating composition is preferably from room temperature to 250° C.

In a case where the solvent (G) is used for the application of the coating composition, such a solvent (G) is preferably removed by e.g. evaporation by heating, depressurizing, etc. before or at the same time as carrying out the curing.

The reflector of the present invention as described above, has a cured coating film layer formed by the coating composition of the present invention and being excellent in the durability such as heat resistance, moisture resistance, water resistance, etc., the weather resistance, the scratch resistance and the impact resistance, and thus is useful stably for a long period of time.

Further, the reflector of the present invention is not limited to the above-mentioned reflector 10. For example, between the glass substrate 11 and the reflective metal layer 12, another layer may be formed for the purpose of e.g. improving their adhesion. Likewise, also between the reflective metal layer 12 and the cured coating film layer 13, another layer (such as the above anti-corrosive coating film layer) may be formed for the purpose of e.g. further protecting the reflective metal layer 12. Such other layers may be two or more layers.

EXAMPLES

Now, the present invention will be described in detail with reference to Examples. However, it should be understood that the present invention is by no means restricted by the following description.

Examples 1 to 7 are Preparation Examples, and Examples 8 to 14 are Working Examples of the present invention.

<Preparation of Fluoropolymer (A)>

Example 1

Into a pressure resistant reactor having an internal capacity of 2,500 mL, made of stainless steel and equipped with a stirrer, 590 g of xylene, 170 g of ethanol, 129 g of 4-hydroxybutyl vinyl ether (HBVE) as the monomer (a2-1), 206 g of ethyl vinyl ether (EVE) and 208 g of cyclohexyl vinyl ether (CHVE) as the monomer (a3), 11 g of calcium carbonate, and 3.5 g of perbutyl perpivalate (PBPV) were charged, and dissolved oxygen in the solution was removed by nitrogen deaeration.

Then, 660 g of chlorotrifluoroethylene (CTFE) as a fluoroolefin was introduced, and the temperature was gradually raised, and while maintaining the temperature at 65° C., the reaction was continued. After the reaction for 10 hours, the reactor was cooled with water to terminate the reaction. The reaction solution was cooled to room temperature, then non-reacted monomers were purged, and the obtained reaction solution was filtered through diatomaceous earth to remove a solid content. Then, a part of xylene and ethanol were removed by reduced pressure distillation to obtain a xylene solution of a hydroxy group-containing fluoropolymer (fluoropolymer (Aa)) (nonvolatile component: 60%).

Example 2

Into an autoclave having an internal capacity of 3,000 mL, made of stainless steel and equipped with a stirrer, 722 g of xylene, 189 g of ethanol, 90.7 g of HBVE as the monomer (a2-1), 284.5 g of CHVE and 202.9 g of 2-ethylhexyl vinyl ether (EHVE) as the monomer (a3), and 9.5 g of potassium carbonate were put all at once, and dissolved oxygen was removed by nitrogen.

Then, 505 g of CTFE as a fluoroolefin was introduced into the autoclave, and the temperature was gradually raised. After the temperature reached 65° C., 7 g of a xylene solution containing 50% of t-butyl peroxypivalate was introduced into the autoclave over a period of 7 hours, followed by stirring for further 15 hours, whereupon the reaction was terminated. Then, potassium carbonate was removed by filtration to obtain a xylene solution of a hydroxy group-containing fluoropolymer (nonvolatile content: 60%, hydroxy value: 36 mgKOH/g). Into a 1 L eggplant-form flask, 600 g of the above xylene solution of the hydroxy group-containing fluoropolymer and 210 g of mineral spirit were added, and while carrying out evaporation, solvent substitution to mineral spirit was carried out to obtain a mineral spirit solution of the hydroxy group-containing fluoropolymer (nonvolatile content: 73.5%).

Into a four necked flask having a capacity of 500 mL and equipped with a thermometer, a reflux condenser and a stirrer, 326.5 g of the above mineral spirit solution of the hydroxy group-containing fluoropolymer, 38.1 g of 3-isocyanate propyl triethoxysilane (IPTES) as the compound (1) and 0.05 g of tin 2-ethyl hexanoate were added, and in a nitrogen atmosphere, a reaction was carried out at 50° C. for 5 hours.

The composition of the obtained polymer was measured by $H^1$-NMR (proton NMR), whereby units derived from CTFE/units derived from CHVE/units derived from EHVE/units derived from HBVE/units having hydroxy groups of units derived from HVBE reacted with isocyanate groups of IPTES (mol %)=50/26/15/1/8.

After the reaction, trimethyl orthoformate (13.6 g), and isopropanol (13.6 g) were added respectively, to obtain a mineral spirit solution of the alkoxysilyl group-containing fluoropolymer (fluoropolymer (Ab)) (nonvolatile content: 70.0%).

<Preparation of Coating Composition>

Example 3

To 83 g of the xylene solution of the fluoropolymer (Aa) obtained in Example 1 (nonvolatile content: 60%), 200 g of titanium oxide ("D-918" tradename, manufactured by Sakai Chemical Industry Co., Ltd.) as the pigment (C), 43 g of xylene, and 43 of butyl acetate were added, and further, 369 g of glass beads having a diameter of 1 mm were added, followed by stirring for two hours by a paint shaker. After the stirring, the glass beads were removed by filtration to obtain a pigment composition.

Then, to 100 g of the pigment composition, 150 g of the xylene solution of the fluoropolymer (Aa) (nonvolatile content: 60%), 18.5 of a HDI nurate type polyisocyanate resin ("CORONATE HX" tradename, manufactured by Nippon Polyurethane Industry Co., Ltd.) as the curing agent (B), and dibutyltin dilaurate (diluted with xylene from 4 to 10 times to 3 g) as the curing catalyst (D) were further added and mixed to obtain a coating composition I.

Example 4

To 214 g of the mineral spirit solution of the fluoropolymer (Ab) obtained in Example 2 (nonvolatile content: 70%), 250 g of titanium oxide ("D-918" tradename, manufactured by Sakai Chemical Industry Co., Ltd.) as the pigment (C), and 100 g of mineral spirit were added, and further, 369 g of glass beads having a diameter of 1 mm were added, followed by stirring for two hours by a paint shaker. After the stirring, the glass beads were removed by filtration to obtain a pigment composition.

Then, to the pigment composition, 126 g of the mineral spirit solution of the fluoropolymer (Ab) (nonvolatile content: 70%), 119 g of phenyl trimethoxysilane as the curing agent (B), 2 g of a phosphoric acid catalyst ("AP-8" tradename, manufactured by Daihachi Chemical Industry Co., Ltd.), and 1 g of a leveling agent ("BYK-300" tradename, manufactured by BYK-Chemie) were further added to obtain a coating composition II.

Example 5

To 16.7 g of the xylene solution of the fluoropolymer (Aa) obtained in Example 1 (nonvolatile content: 60%), 40.0 g of titanium oxide ("D-918" tradename, manufactured by Sakai Chemical Industry Co., Ltd.) as the pigment (C), 20.0 g xylene, and 23.2 g of butyl acetate were added, and further, 100.0 g of glass beads having a diameter of 1 mm were added, followed by stirring for two hours by a paint shaker. After the stirring, the glass beads were removed by filtration to obtain a pigment composition.

Then, to 31.4 g of the pigment composition, 44.0 g of the xylene solution of the fluoropolymer (Aa) (nonvolatile content: 60%), 10.2 g of a blocked isocyanate resin ("Sumidur BL3175" tradename, manufactured by Sumika Bayer Urethane Co., Ltd.) as the curing agent (B), 12.6 g of butyl acetate, and dibutyltin dilaurate (diluted with xylene from 4 to 10 times to 1.8 g) as the curing catalyst (D) were further added and mixed to obtain a coating composition III.

Example 6

To 16.7 g of the xylene solution of the fluoropolymer (Aa) obtained in Example 1 (nonvolatile content: 60%), 40.0 g of titanium oxide ("D-918" tradename, manufactured by Sakai Chemical Industry Co., Ltd.) as the pigment (C), 20.0 g of xylene and 23.2 g of butyl acetate were added, and further, 100.0 g of glass beads having a diameter of 1 mm were added, followed by stirring for two hours by a paint shaker. After the stirring, the glass beads were removed by filtration to obtain a pigment composition.

Then, to 31.4 g of the pigment composition, 44.0 g of the xylene solution of the fluoropolymer (Aa) (nonvolatile content: 60%), 8.1 g of a methylated melamine resin ("CYMEL 303", tradename, manufactured by Mitsui Cytec Ltd.) as the curing agent (B), 12.2 g of butyl alcohol, 0.4 g of butyl acetate, and 0.8 g of a p-toluene sulfonic acid solution ("CYMEL 303", tradename, manufactured by Mitsui Cytec Ltd.) neutralized with an amine compound as the curing catalyst (D) were further added and mixed to obtain a coating composition IV.

Example 7

To 100 g of the xylene solution of the fluoropolymer (Aa) obtained in Example 1 (nonvolatile content: 60%), 10.7 g of a HDI nurate type polyisocyanate resin ("CORONATE HX" tradename, manufactured by Nippon Polyurethane Industry Co., Ltd.) as the curing agent (B), 5.0 g of a benzotriazole type ultraviolet absorber ("TINUVIN 384" tradename, manufactured by Ciba Specialty Chemicals), 2.5 g of a hydroxyphenyl triazine type ultraviolet absorber ("TINUVIN 400" tradename, manufactured by Ciba Specialty Chemicals), 100 g of xylene, and dibutyltin dilaurate (diluted with xylene from 4 to 10 times to 3 g) as the curing catalyst (D) were further added and mixed to obtain a coating composition V.

<Evaluation of Coating Film (Cured Coating Film Layer) Formed by Coating Composition>

Example 8

To the surface of a glass substrate, the coating composition I obtained in Example 3 was applied so that the film thickness would be 50 μm and aged in a constant temperature chamber at 25° C. for one week to form a coating film thereby to obtain a coating film-attached test plate I-1.

Further, to the surface of a chromate-treated aluminum plate, the coating composition I was applied so that the film thickness would be 50 μm and aged in a constant temperature chamber at 25° C. for one week to form a coating film thereby to obtain a coating film-attached test plate I-2.

With respect to the coating film-attached test plate I-1, the hardness, water resistance and heat resistance of the coating film were evaluated. Further, with respect to the coating film-attached test plate I-2, a weather resistance test of the coating film was carried out.

Example 9

In the same manner as in Example 8 except that the coating composition II obtained in Example 4 was used, a coating film-attached test plate II-1 having a coating film formed on a glass substrate, and a coating film-attached test plate II-2 having a coating film formed on the surface of an aluminum plate, were obtained.

With respect to the coating film-attached test plate II-1, the hardness, water resistance and heat resistance of the coating film were evaluated. Further, with respect to the coating film-attached test plate II-2, a weather resistance test of the coating film was carried out.

[Evaluation Methods]
(Hardness)

The hardness of a coating film was measured by a method in accordance with JIS K5600-5-4 (1999).

(Water Resistance)

A water resistance test of a coating film was carried out by a method in accordance with JIS K5600-6-2 (1999), and evaluation was made in accordance with the following standards.

"◯": Swelling, damages, etc. were not observed in the coating film.

"x": Swelling, damages, etc. were observed in the coating film.

(Heat Resistance (1): Heat Decomposition Temperature)

Using a differential thermogravimetric measuring apparatus TG/DTA220 (manufactured by Seiko Instruments Inc.), a thermogravimetric analysis was carried out under such conditions that the temperature raising rate was 10° C./min and a nitrogen flow rate was 50 mL/min, and the heat decomposition temperature of a coating film was measured. Here, the temperature at the time when the mass of the coating film decreased by 5% was taken as the heat decomposition temperature (° C.).

(Heat Resistance (2): Glass Transition Temperature (Tg))

Using a thermomechanical analyzer TMA/SS150 (manufactured by Seiko Instruments Inc.), Tg (° C.) of a coating film was measured under a condition of a temperature raising rate of 10° C./min. Here, the temperature at which the elongation of the coating film changed abruptly was taken as Tg of the coating film.

(Weather Resistance)

The coating film-attached test plates I-2 and II-2 were installed outdoors in Naha City of Okinawa Prefecture, and immediately before the installation and after two years, the gloss of the coating film surface was measured by means of PG-1M (gloss meter, manufactured by Nippon Denshoku Industries Co., Ltd.). When the value of the gloss immediately before the installation was taken as 100%, the percentage of the value of the gloss after the two years was calculated as a gloss retention rate (unit: %), and the weather resistance was evaluated in accordance with the following standards.

"◯": The gloss retention rate was at least 80%.

"Δ": The gloss retention rate was at least 60% and less than 80%.

"x": The gloss retention rate was less than 60%.

The evaluation results of the coating films in Examples 8 and 9 are shown in Table 1.

TABLE 1

|  | Example 8 | Example 9 |
| --- | --- | --- |
| Hardness | F | H |
| Water resistance | ◯ | ◯ |
| Heat resistance (1): heat decomposition temperature [° C.] | 220 | 230 |
| Heat resistance (2): Tg [° C.] | 50 | 70 |
| Weather resistance: gloss retention rate [%] | ◯ | ◯ |

<Preparation and Evaluation of Solar Heat-Collecting Reflector>

Example 10

On one side of a glass substrate, silver plating treatment was applied so that the thickness would be 800 mg/m², and then, on the plated silver film, an epoxy resin type back coating material for mirror, containing no lead ("SM tradename COAT DF", manufactured by Dainippon Toryo Co., Ltd.) was applied by a curtain flow coater so that the thickness of the dried coating film would be 30 μm and cured in a drying furnace at 180° C. Thereafter, by cooling in an annealing furnace to room temperature, an anti-corrosive coating film-attached reflector was obtained.

Then, on the anti-corrosive coating film of the anti-corrosive film-attached reflector, the coating composition I obtained in Example 3 was applied so that the film thickness would be 25 μm and dried and cured in an oven of 180° C. for 5 minutes. Further, along the edge portion of the reflector, the coating composition I obtained in Example 3 was applied and aged at room temperature for one week to obtain a solar heat-collecting reflector for tests. With respect to the obtained solar heat-collecting reflector, an accelerated weather resistance test and a real exposure test were carried out.

Example 11 to Example 14

Solar heat-collecting reflectors were obtained in the same manner as in Example 10 except that the coating compositions II to V obtained in Examples 4 to 7 were used. With respect to the obtained solar heat-collecting reflectors, an accelerated weather resistance test and a real exposure test were carried out.

Comparative Example

On one side of a glass substrate, silver plating treatment was applied so that the thickness would be 800 mg/m$^2$, and then, on the plated silver film, an epoxy resin type back coating material for mirror, containing no lead ("SM tradename COAT DF", manufactured by Dainippon Toryo Co., Ltd.) was applied by a curtain flow coater so that the thickness of the dried coating film would be 30 μm and cured in a drying furnace at 180° C. Thereafter, by cooling in an annealing furnace to room temperature, an anti-corrosive coating film-attached reflector was obtained. Further, along the edge portion of the reflector, the coating composition I obtained in Example 3 was applied and aged at room temperature for one week to obtain a solar heat-collecting reflector for tests. With respect to the obtained solar heat-collecting reflector, an accelerated weather resistance test and a real exposure test were carried out.

[Evaluation Methods]
(Accelerated Weather Resistance Test)

Using Accelerated Weathering Tester (model: QUV/SE, manufactured by Q-PANEL LAB PRODUCTS), the gloss retention rate of a coating film, the presence or absence of peeling of the coating film, and abnormality of the silver reflective layer were evaluated by comparing the initial stage and after exposure for 5,000 hours.

1. Gloss Retention Rate of Coating Film

The gloss of the coating film surface was measured by means of PG-1M (gloss meter: manufactured by Nippon Denshoku Industries Co., Ltd.), and the weather resistance was evaluated in accordance with the following standards.

"○": The gloss retention rate was at least 80%.
"Δ": The gloss retention rate was at least 60% and less than 80%.
"x": The gloss retention rate was less than 60%.

2. Presence or Absence of Peeling of Coating Film

The weather resistance was evaluated in accordance with the following standards.

"○": Peeling of the coating film was not observed.
"x": Peeling of the coating film was observed.

3. Abnormality of Silver Reflective Layer

The weather resistance was evaluated in accordance with the following standards.

"○": No deterioration was observed in the reflectance of the reflector due to silver shrinkage, rust, etc.
"x": A deterioration was observed in the reflectance of the reflector due to silver shrinkage, rust, etc.

(Real Exposure Test)

The obtained solar heat-collecting reflector was installed outdoors in Naha City of Okinawa Prefecture, and the gloss retention rate of the coating film, the presence or absence of peeling of the coating film, and abnormality of the silver reflective layer were evaluated by comparing immediately before the installation and after one year.

1. Gloss Retention Rate of Coating Film

The gloss of the coating film surface was measured by means of PG-1M (gloss meter, manufactured by Nippon Denshoku Industries Co., Ltd.), and the weather resistance was evaluated in accordance with the following standards.

"○": The gloss retention rate was at least 80%.
"Δ": The gloss retention rate was at least 60% and less than 80%.
"x": The gloss retention rate was less than 60%.

2. Presence or Absence of Peeling of Coating Film

The weather resistance was evaluated in accordance with the following standards.

"○": Peeling of the coating film was not observed.
"x": Peeling of the coating film was observed.

3. Abnormality of Silver Reflective Layer

The weather resistance was evaluated in accordance with the following standards.

"○": No deterioration was observed in the reflectance of the reflector due to silver shrinkage, rust, etc.
"x": A deterioration was observed in the reflectance of the reflector due to silver shrinkage, rust, etc.

The evaluation test results of the solar heat-collecting reflectors in Examples 10 to 14 and Comparative Example are shown in Table 2.

TABLE 2

|  | Ex. 10 | Ex. 11 | Ex. 12 | Ex. 13 | Ex. 14 | Comp. Ex. |
|---|---|---|---|---|---|---|
| Accelerated weather resistance test |  |  |  |  |  |  |
| 1. Gloss retention rate of coating film | ○ | ○ | ○ | ○ | ○ | x |
| 2. Presence or absence of peeling of coating film | ○ | ○ | ○ | ○ | ○ | x |
| 3. Abnormality of silver reflective layer | ○ | ○ | ○ | ○ | ○ | x |
| Real exposure test |  |  |  |  |  |  |
| 1. Gloss retention rate of coating film | ○ | ○ | ○ | ○ | ○ | x |
| 2. Presence or absence of peeling of coating film | ○ | ○ | ○ | ○ | ○ | x |
| 3. Abnormality of silver reflective layer | ○ | ○ | ○ | ○ | ○ | x |

As shown in Table 1, the coating films in Examples 8 and 9 formed by the coating compositions of the present invention, had high hardness and were excellent in scratch resistance and impact resistance. Further, they had high heat decomposition temperatures and Tg and thus were excellent also in heat resistance, and they were also excellent in water resistance. Further, in the weather resistance test, the gloss of the aluminum plate having the coating film formed thereon was maintained at a high level, and thus they had excellent weather resistance.

Further, as compared with the coating film in Example 8 formed by the fluoropolymer (A1) having a hydroxy group and the isocyanate type curing agent, the coating film in Example 9 formed by the fluoropolymer (A2) having an alkoxysilyl group and the metal alkoxide, had a higher hardness and superior scratch resistance and impact resistance and was also superior in the heat resistance.

Further, as shown in Table 2, with the solar heat-collecting reflectors having coating compositions of the present invention applied, no abnormality of the reflectors was observed. On the other hand, with the solar heat-collecting reflector not having the coating composition of the present invention applied, the coating film peeled in the accelerated weather resistance test and after the real exposure test, and a deterioration in the reflectance of the silver reflective layer was observed.

INDUSTRIAL APPLICABILITY

The present invention provides a coating composition for back coating that is used for producing a solar heat-collecting reflector to be used for a solar heat-collecting system and that is used for forming a cured coating film layer to protect a metal reflective layer of the reflector. Further, the solar heat-collecting reflector of the present invention is a reflector for solar heat collection in a solar heat-collecting system.

This application is a continuation of PCT Application No. PCT/JP2011/054188, filed on Feb. 24, 2011, which is based upon and claims the benefit of priority from Japanese Patent Application No. 2010-042404 filed on Feb. 26, 2010. The contents of those applications are incorporated herein by reference in its entirety.

REFERENCE SYMBOLS

10: Reflector, 11: Glass substrate, 12: Reflective metal layer, 13: Cured coating film layer

What is claimed is:

1. A solar heat-collecting reflector comprising a transparent substrate, a reflective metal layer, an anti-corrosive coating film layer, and a cured coating film layer laminated in the order of the transparent substrate, the reflective metal layer, the anti-corrosive coating film layer, and the cured coating film layer, wherein the cured coating film layer is a cured coating film layer formed from a coating composition comprising a fluoropolymer (A) having units (A1) derived from a fluoroolefin and units (A2) having a crosslinkable group.

2. The solar heat-collecting reflector according to claim 1, wherein the transparent substrate is a glass substrate.

3. The solar heat-collecting reflector according to claim 1, wherein the anti-corrosive coating film layer is a layer formed from a back coating material.

4. The solar heat-collecting reflector according to claim 1, wherein the anti-corrosive coating film layer comprises a metal compound and a resin.

5. The solar heat-collecting reflector according to claim 1, wherein the units (A1) derived from a fluoroolefin are units derived from at least one fluoroolefin selected from the group consisting of tetrafluoroethylene, chlorotrifluoroethylene, hexafluoropropylene, vinylidene fluoride and vinyl fluoride.

6. The solar heat-collecting reflector according to claim 1, wherein the crosslinkable group is at least one crosslinkable group selected from the group consisting of a hydroxy group, a carboxy group, an amino group, an epoxy group, an alkoxysilyl group and an isocyanate group.

7. The solar heat-collecting reflector according to claim 1, wherein the coating composition further comprises (B) a curing agent.

8. The solar heat-collecting reflector according to claim 7, wherein the curing agent (B) is a metal alkoxide (B-1) and the crosslinkable group is at least one crosslinkable group selected from the group consisting of an alkoxysilyl group and a hydroxy group.

9. The solar heat-collecting reflector according to claim 7, wherein the curing agent (B) is at least one curing agent selected from the group consisting of an isocyanate-based curing agent (B-2), a blocked isocyanate-based curing agent (B-3) and an amino resin (B-4), and the crosslinkable group is a hydroxy group.

10. The solar heat-collecting reflector according to claim 1, wherein the coating composition further comprises at least one pigment (C) selected from the group consisting of an anti-corrosive pigment, a coloring pigment, and an extender pigment.

11. The solar heat-collecting reflector according to claim 1, wherein the cured coating film layer has a heat decomposition temperature of no less than 220° C.

12. The solar heat-collecting reflector according to claim 1, wherein the cured coating film layer has a glass transition temperature of no less than 50° C.

13. A method of solar heat-collecting comprising collecting solar heat via the solar heat-collecting reflector according to claim 1.

14. A process for producing the solar heat-collecting reflector according to claim 1, which comprises forming a layer of the coating composition on the side having a reflective metal layer, of a transparent substrate having the reflective metal layer on one side, and then curing the coating composition to form a cured coating film layer.

* * * * *